Oct. 20, 1931.  E. S. CULVER  1,828,101

FLEXIBLE HOSE

Filed June 18, 1928

INVENTOR
Edwin S. Culver
BY
ATTORNEY

Patented Oct. 20, 1931

1,828,101

UNITED STATES PATENT OFFICE

EDWIN S. CULVER, OF OAKLAND, CALIFORNIA, ASSIGNOR, BY MESNE ASSIGNMENTS, TO OLIVER UNITED FILTERS INCORPORATED, OF SAN FRANCISCO, CALIFORNIA, A CORPORATION OF NEVADA

FLEXIBLE HOSE

Application filed June 18, 1928. Serial No. 286,354.

The present invention relates to a flexible reinforced pipe or hose structure through which material may be drawn by suction or forced under pressure.

The principal object is to provide a pipe or hose of flexible construction with a reinforcement, one snugly embracing the other, and the reinforcement precluding the collapsing of the hose structure should the same be subjected to undue suction, and also precluding the outward distortion of the hose structure should the same be subjected to undue pressure, the reinforcement at all times being adapted to flex at points throughout its length enabling the pipe to be deflected into various positions as its use may necessitate.

Another object is to provide a flexible reinforced pipe having attaching devices at its ends capable of adjustment to enable the pipe to be elongated or shortened without interfering with the flexibility of the reinforcement.

A further object is to provide a reinforcement consisting of substantially duplicate distortionless rings arranged in edge bearing relation with the rings provided at opposite edges with pairs of bearing projections; and to provide end coupling nipples for the reinforcement which have cam edge bearing contact with the edges of the terminal rings of the reinforcement coupling during axial rotation to vary the over all length of the reinforcement.

Another object is to provide a reinforcement which shall prevent axial contraction or elongation due to the vacuum or pressure in the pipe.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein.

Figure 1:
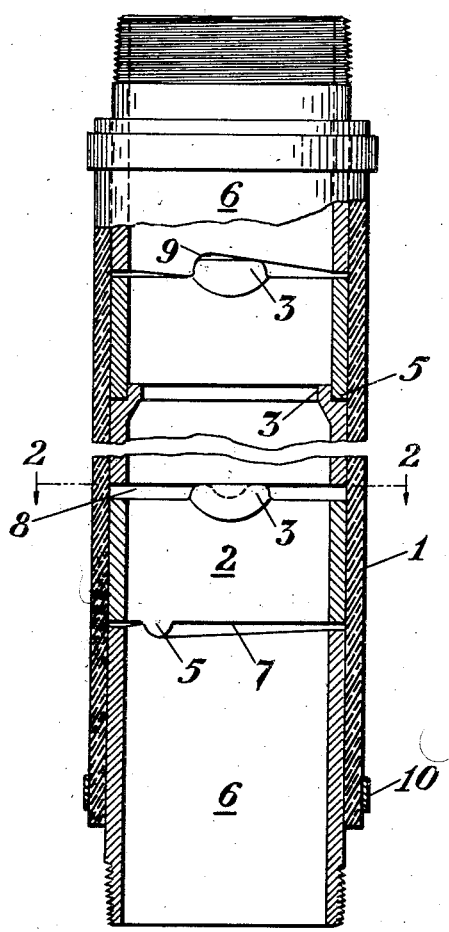
Fig. 1 is a view of the preferred embodiment of my invention in transverse vertical section with the parts in assembled relation.
Figure 2:
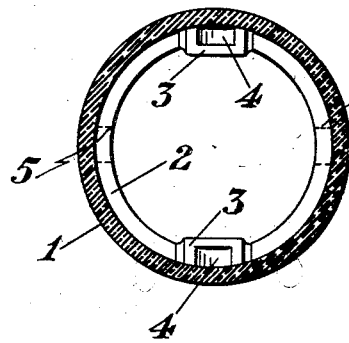
Fig. 2 is a transverse sectional view on line 2—2 of Fig. 1, illustrating more particularly the sockets at one edge of a ring.
Figure 3:
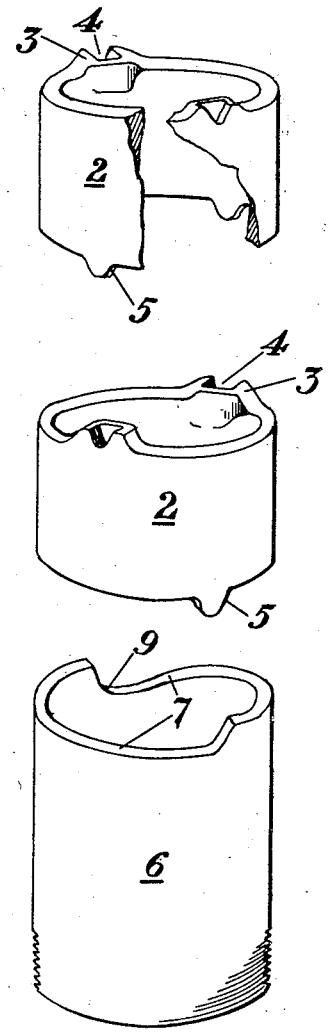
Figure 3 is an "exploded" perspective view of two of the rings (2) and one of the end nipples (6) associated therewith.

Referring more particularly to the drawings wherein like characters of reference designate corresponding parts in all views, 1 indicates a flexible hose body, the embodiment illustrated being of the conventional canvas and rubber structure. 2 indicates a reinforcing ring preferably of rigid structure, such as metal or the like. One edge of the ring is provided with lugs 3, the outer faces of which are socketed at 4. The other edge of the ring is provided with projections 5, the same to engage with sockets on adjacent rings.

Tubular attaching nipples 6, preferably two in number, are provided, and one edge of each is provided with a cam surface 7.

To provide what may be termed a vacuum hose, a hose body 1 has inserted thereinto with the inner surface of the hose embracing the outer face of the rings, successive rings 2, arranged with the projections 5 of one ring seated within the sockets 4 of the adjacent edge of the next succeeding ring, interlocking the rings from lateral or rotary displacement and providing a fulcrum between the ring edges. also affording a space 8 between adjacent edges at either side of the fulcrum points. The fulcrum points between successive rings may be disposed angularly to each other, as in the drawings, or in parallel alignment, which is obvious, enabling relative maximum flexibility of the reinforcement throughout its length. After the desired number of rings have been positioned, as above described, to afford a reinforcement for the hose body 1, for approximately its entire length, a tubular rigid attaching nipple 6 is inserted into each end of the hose with the steps 9 of their respective cam edges 7 lying at one side of the lugs 3 or projections 5 of their associated end rings. With a hose band 10 of conventional type around each end of the hose, the approximate over all length of the reinforcement corresponds substantially to the distance between the elements to be connected thereby. With the hose lying between the pipes to be connected, the operator axially rotates the nipple 6 to extend the structure to make the coupling desired, this adjustment ensuring cooperating bearing contact between the fulcrum points of adjacent rings. This adjustment makes the assembled hose substantially rigid in axial direction and prevents axial contraction when vacuum is applied. The desired adjustment having been made, the hose bands 10 are tightened and the operation is complete. The hose may be utilized with one end free, in which case the nipple at the free end is clamped in the hose with each section in bearing contact.

Rings may be of various materials or may be of hard material covered with other material, as, for instance, rubber suitable to resist action of corrosive and/or abrasive agents. The covering may be of material of suitable consistency and arrangement to substantially close the spaces between the rings and provide a substantially smooth bore.

It will be apparent that the reinforcement is of the unit section type, the units being duplicates, and are capable of being cheaply constructed, also that the units will at all times be held in bearing contact relation when the hose is mounted in position, and that the hose is capable of deflection on an axis transverse to axis of hose, and is capable of withstanding high vacuum or high pressure as the case may be, depending on the relative positioning of the hose and reinforcement.

I claim:—

1. A hose comprising a tubular flexible hose body and a tubular reinforcement extending longitudinally thereof, one snugly embracing the other, said reinforcement including a plurality of relatively indistortable rings detachably assembled to fulcrum on adjacent edges of succeeding rings on axes at right angles to the axis of the hose, and a tubular attaching nipple at each end of the reinforcement, each nipple having bearing contact with its associated ring and adjustable longitudinally of the hose on the imparting of axial rotation thereto relative to the associated rings.

2. A hose comprising a tubular flexible hose body and a tubular reinforcement extending longitudinally thereof, one snugly embracing the other, said reinforcement including a plurality of relatively indistortable rings detachably assembled to fulcrum on adjacent edges of succeeding rings on axes at right angles to the axis of the hose, and a tubular attaching nipple at each end of the reinforcement, each nipple having bearing contact with its associated ring, one of said nipples being adjustable longitudinally of the hose on the imparting of axial rotation thereto relative to its associated ring.

In testimony whereof I have signed my name to this specification.

EDWIN S. CULVER.